United States Patent
Hazel et al.

(10) Patent No.: US 9,442,131 B2
(45) Date of Patent: Sep. 13, 2016

(54) SYSTEM AND METHOD FOR RUN-TIME HERMETICITY DETECTION OF A CAPPED MEMS DEVICE

(71) Applicant: Analog Devices, Inc., Norwood, MA (US)

(72) Inventors: Matthew Aaron Hazel, Malden, MA (US); James Wilson, Foxborough, MA (US); Colm Prendergast, Cambridge, MA (US); Daniel Boyko, Norwood, MA (US); Benoit Dufort, Stoneham, MA (US)

(73) Assignee: Analog Devices, Inc., Norwood, MA (US)

( * ) Notice: Subject to any disclaimer, the term of this patent is extended or adjusted under 35 U.S.C. 154(b) by 579 days.

(21) Appl. No.: 13/799,382

(22) Filed: Mar. 13, 2013

(65) Prior Publication Data

US 2014/0260515 A1 Sep. 18, 2014

(51) Int. Cl.
*G01P 21/00* (2006.01)
*G01P 15/125* (2006.01)

(52) U.S. Cl.
CPC ............. *G01P 21/00* (2013.01); *G01P 15/125* (2013.01)

(58) Field of Classification Search
CPC ................................ G01P 1/023; G01P 21/00
USPC ......................................................... 73/1.38
See application file for complete search history.

(56) References Cited

U.S. PATENT DOCUMENTS

| | | | | |
|---|---|---|---|---|
| 5,456,111 A * | 10/1995 | Hulsing, II | ................. | 73/514.32 |
| 5,872,309 A * | 2/1999 | Pinter | ............................ | 73/49.3 |
| 5,955,659 A * | 9/1999 | Gupta et al. | ................. | 73/54.01 |
| 6,638,784 B2 | 10/2003 | Bartlett et al. | .................. | 438/51 |
| 6,675,633 B2 * | 1/2004 | Cramer | .......................... | 73/49.3 |
| 7,980,135 B2 * | 7/2011 | Prandi et al. | ............... | 73/504.12 |
| 8,011,226 B2 | 9/2011 | Hua et al. | .......................... | 73/40 |
| 8,156,805 B2 * | 4/2012 | Hayner et al. | ............. | 73/504.12 |
| 8,267,486 B2 | 9/2012 | Sammoura et al. | ..... | 303/122.05 |
| 8,921,128 B2 * | 12/2014 | Chen et al. | ....................... | 438/15 |
| 2007/0056370 A1 * | 3/2007 | Braman et al. | ............ | 73/514.07 |
| 2007/0084270 A1 * | 4/2007 | Jarrett | ............................ | 73/49.2 |
| 2007/0196923 A1 * | 8/2007 | Gueissaz et al. | ................. | 436/3 |
| 2008/0141759 A1 * | 6/2008 | Reinert et al. | .................... | 73/40 |

(Continued)

OTHER PUBLICATIONS

N. Deb and R.D. (Shawn) Blanton, "Built-In Self Test of CMOS-MEMS Accelerometers*," *Proceedings of the IEEE International Test Conference (ITC)*, pp. 1075-1084, Oct. 7-10, 2002.

*Primary Examiner* — Lisa Caputo
*Assistant Examiner* — Alexander Mercado
(74) *Attorney, Agent, or Firm* — Sunstein Kann Murphy & Timbers LLP

(57) ABSTRACT

Determining if a hermetically sealed MEMs device loses hermeticity during operation. In one embodiment, the MEMs device is an accelerometer. A test signal having an associated frequency above an operational frequency range for the accelerometer is provided to the accelerometer at an input during operation of the accelerometer for sensing an acceleration. The output signal of the accelerometer is filtered at least above the operational frequency range of the accelerometer producing a test output signal. The test output signal is then compared to a predetermined threshold to determine if the amplitude of the test output signal differs from the threshold. If the amplitude of the test output signal differs from the predetermined threshold, an error signal is produced indicating that hermeticity of the accelerometer has been lost.

22 Claims, 7 Drawing Sheets

(56) References Cited

U.S. PATENT DOCUMENTS

| | | | |
|---|---|---|---|
| 2008/0184778 A1* | 8/2008 | Abbink et al. | 73/40 |
| 2009/0322183 A1* | 12/2009 | Kawakubo et al. | 310/329 |
| 2010/0050747 A1* | 3/2010 | Hua et al. | 73/40 |
| 2010/0139373 A1* | 6/2010 | Braman et al. | 73/40.7 |
| 2010/0154517 A1* | 6/2010 | Sammoura | 73/49.3 |
| 2011/0146402 A1* | 6/2011 | Donadel et al. | 73/504.12 |
| 2011/0179861 A1* | 7/2011 | Grange et al. | 73/335.04 |
| 2012/0204644 A1* | 8/2012 | Varak et al. | 73/514.34 |
| 2013/0041334 A1* | 2/2013 | Prioleau et al. | 604/361 |
| 2013/0320466 A1* | 12/2013 | Chen et al. | 257/417 |
| 2014/0250971 A1* | 9/2014 | Fang et al. | 73/1.37 |

* cited by examiner

SYSTEM AND METHOD FOR RUN-TIME HERMETICITY DETECTION OF A CAPPED MEMS DEVICE

TECHNICAL FIELD

The present invention relates to systems and methods for determining hermeticity of a capped MEMS device and more specifically, determining hermeticity during operation of the MEMS device in the field.

BACKGROUND ART

Microelectromechanical systems ("MEMS," also referred to as "MEMS devices") are a specific type of integrated circuit used in a growing number of applications. For example, MEMS currently are implemented as gyroscopes to detect the yaw rate (turn rate) of automobiles, and as accelerometers to selectively deploy air bags in automobiles. In simplified terms, such MEMS devices typically have a very fragile movable structure suspended above a substrate, and associated circuitry that both senses movement of the suspended structure and delivers the sensed movement data to one or more external devices (e.g., an external microprocessor). The external device processes the sensed data to calculate the property being measured (e.g., rotation rate or acceleration).

Some MEMS devices measure acceleration in a preferred direction by means of measuring a torque about an axis of rotation. For example, a mass suspended above a substrate has an off-center axis of rotation, so that more weight is on one side of the axis than on the other side. This uneven distribution of mass results in a moment of inertia about the axis of rotation. When an acceleration is produced in a direction perpendicular to the substrate, the moment of inertia results in a torque about the axis of rotation, causing the suspended mass to rotate. An effective spring constant caused by stresses in the suspension counterbalances the torque, so that under constant acceleration, a fixed angle is obtained after a short time. The angle of rotation, and hence the magnitude of the acceleration, may then be measured. An accelerator with this design is called a "teeter-totter accelerometer," based on the motion of the suspended mass under varying accelerations.

The distance between the substrate and the suspended mass often is measured by sensing a capacitance between the rotating mass and one or more stationary sensing electrodes. These electrodes are spaced equidistantly on opposite sides of the axis of rotation, so the capacitance changes equally (but oppositely) for each electrode as the mass rotates. The accelerometer may be calibrated for non-zero accelerations by clamping different voltages to one or more driving electrodes to produce an electrical torque about the axis of rotation. The suspended mass will deflect a certain distance, but will resist further deflection due to the presence of the effective mechanical spring constant. The voltage clamps are then released and the time variations of the capacitances through the sensing electrodes are measured. A computation is then performed using knowledge of the spring constant to determine the mechanical torque produced by the voltage clamps. The effective "acceleration" at the given voltages may be determined using knowledge about the weight distribution of the suspended mass.

It is known in the prior art to enclose a micromachined ("MEMS") inertial sensor in a package to protect the inertial sensor from damage. Some inertial sensors are hermetically sealed to maintain a desired atmosphere and environment. A typical MEMS inertial sensor includes at least one movable component movably suspended above a substrate. The Substrate and movable component face each other across a gap, and have dimensions that are large relative to the gap.

An accelerometer is a type of transducer that converts acceleration forces into electronic signals. Accelerometers are used in a wide variety of devices and for a wide variety of applications. For example, accelerometers are often included various automobile systems, such as for air-bag deployment and roll-over detection. Accelerometers are often also included in many computer devices, such as for motion-based sensing (e.g., drop detection) and control (e.g., motion-based control for gaming).

In the case of an accelerometer, the movable component may be known as a "beam." The inertia of the beam will cause the beam to be displaced relative to the substrate when the accelerometer is subjected to an acceleration. The quantity of such displacement is a function of the acceleration, as well as the properties of the beam and its suspension system. In the design process of an accelerometer, a fluid having a known viscosity is selected to be present within the hermetically sealed cap. This gas provides a medium through which the beam will travel due to applied force. The accelerometer is precisely calibrated to the hermetically sealed fluid. If the hermeticity of the sealed cap is broken, the accuracy of the MEMS sensor will be compromised. First, the fluid will be lost and replaced with air changing the viscosity. Additionally, the pristine environment will be subject to the environment and oxidation, which can interfere with operation of the mechanical aspects of the MEMS sensor and can cause stiction.

SUMMARY OF THE EMBODIMENTS

Embodiments of the invention include systems, methods, and computer program products for determining if a hermetically sealed MEMs device loses hermeticity during operation of the MEMs device in the field or at any point in the lifecycle of the device. In one embodiment, the MEMs device is an accelerometer. A test signal having an associated frequency above an operational frequency range for the accelerometer is provided to the accelerometer at an input during operation of the accelerometer for sensing an acceleration. The output signal of the accelerometer is filtered at least above the operational frequency range of the accelerometer producing a test output signal. Most accelerometers focus on signals that are 100 Hz and less, as such, a test signal may be any signal above this operational range of the accelerometer for which a meaningful change in amplitude can be observed and in some embodiments the test signal will be greater than or equal to 1000 Hz. The test output signal is then compared to a predetermined threshold to determine if the amplitude of the test output signal differs from the threshold. If the amplitude of the test output signal differs from the predetermined threshold, an error signal is produced indicating that hermeticity of the accelerometer has been lost. In embodiments of the invention, both a magnitude and a polarity are compared, By using both a magnitude and polarity, the system can discriminate between a loss of hermeticity and, for example, breakage of the sensor.

In certain embodiments, the test signal is an alternating current test signal. The test signal may be applied to test electrodes causing the accelerometer to oscillate. The test signal may be an alternating current test signal. In other embodiments, the test signal may be a periodic step function.

The presently described test methodology can be employed during operation of the accelerometer, as such the accelerometer may be provided with an external stimulus generating a stimulus portion of the output signal. As such, the output signal of the accelerometer is composed of the stimulus portion and the test portion.

During operation, in order to provide an accurate acceleration signal as the result of an external stimulus, the output signal is filtered with a filter to remove the test portion of the output signal. The filtered output signal is provided to an output wherein the filtered output signal represents the acceleration due to the external stimulus. The methodology may be performed by circuitry that either is located internal to the accelerometer packaging or may be performed by circuitry external to the accelerometer packaging.

The output signal of the accelerometer may be passed to two separate paths. On the first path, the output signal is filtered with a high-pass filter above the operational frequency range of the accelerometer. In another embodiment, the resultant portion of the test signal is filtered out of the output signal by use of a notch filter. A notch filter provides greater accuracy given that the test signal can be an applied signal with a known frequency. In a second path, the output signal is filtered with a low pass filter to remove the test portion of the output signal preserving the acceleration signal resulting from an external stimulus.

The invention may also be embodied as a system. The system includes a plurality of paths wherein the paths are coupled at an input that receives the output signal of the accelerometer. Along the first path is a first filter that is coupled to the input for filtering the output signal of the accelerometer to remove the test signal from the output signal so that only an acceleration signal remains as the result of the external stimulus. Along the second path is a second filter coupled to the input for filtering the output signal of the accelerometer to remove a stimulus portion of the output signal from the output signal so that only the test portion of the output signal remains. The system also includes a comparison module for comparing the test portion of the output signal to a threshold and outputting an error signal if the test portion of the output signal varies from the threshold. The system may also include a test generation signal module for generating a test signal for the accelerometer at a frequency above an operational range for the accelerometer. In certain embodiments, the first filter is a low pass filter. The second filter may be either a notch filter or a high-pass filter. The system may also include a hermetically sealed accelerometer.

The comparison module of the system may in certain embodiments be a comparator. The comparison module may include logic for identifying an amplitude for at least one frequency of the output signal corresponding to a known test signal and comparing the amplitude to the threshold.

The methodology may also be embodied as a computer program. The computer program may be stored on a tangible computer-readable medium and generate a test signal for the accelerometer, receive the output signal of the accelerometer, filter the output signal so as to isolate the resultant test signal within the output signal and produce an error signal if the amplitude of the filtered output signal is different from a threshold.

BRIEF DESCRIPTION OF THE DRAWINGS

The foregoing features of embodiments will be more readily understood by reference to the following detailed description, taken with reference to the accompanying drawings, in which:

FIG. 3A show the frequency response curve for an overdamped accelerometer;

FIG. 3B shows the frequency response curve for an underdamped accelerometer;

FIG. 3C shows the frequency response curves for an overdamped hermetically capped accelerometer with hermeticity and without hermeticity for a fill gas having a high viscosity relative to the ambient air;

FIG. 3D shows the frequency response curves for an underdamped accelerometer with hermeticity and without hermeticity for a fill gas having a high viscosity;

FIG. 3E shows the frequency response curves for an overdamped accelerometer with hermeticity and without hermeticity for a fill gas having a low viscosity;

FIG. 3F shows the frequency response curves for an underdamped accelerometer with hermeticity and without hermeticity for a fill gas having a low viscosity;

DETAILED DESCRIPTION OF SPECIFIC EMBODIMENTS

Various embodiments of the invention teach a system and method for determining whether the hermeticity of an accelerometer's cap is maintained during operation. One way to moderate the response of an accelerometer is to encapsulate the accelerometer's beam in a hermetically sealed cavity formed by a cap and filled with a viscous gas. The viscous gas presents a thick atmosphere through which the beam must move, and the very thickness of that atmosphere tends to resist the motion of the beam. To dampen an accelerometer the volume may be filled with gases such as air or argon with viscosities of 18 and 22 respectively although other gases may also be used.

Typically, accelerometers are designed and manufactured to have a pronounced response to an applied acceleration at a frequency well below the accelerometer's resonant frequency, because such a response tends to desirably increase the sensitivity of the accelerometer. Generally, the greater the displacement of the beam of the accelerometer the greater the change in the capacitance between the conductive fingers of the movable mass and finger connected to the substrate.

Figure 1:
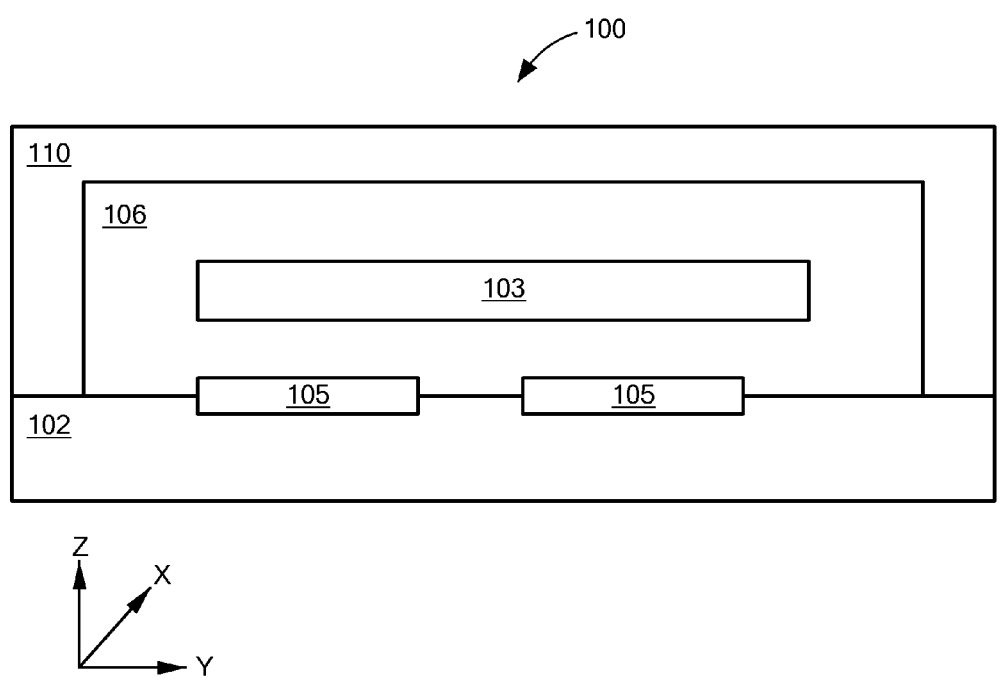
FIG. 1 is a side view of a MEMS accelerometer.

FIG. 1 is a side view of an accelerometer wherein the accelerometer 100 includes a hermetically sealed cap 110. The accelerometer includes a substrate 102 and a suspended movable mass 103 known as a beam that resides within a volume 106 defined by the cap and the substrate. Attached to the substrate are a plurality of electrodes 105. The suspended movable mass also has a plurality of attached electrically conductive electrodes (not shown) or the suspended mass is conductive. Thus, for each electrode of the substrate a capacitor is formed between the electrode and the substrate. As a result, changes in capacitive charge can be sensed as the movable mass changes position as the result of an acceleration or an applied signal.

Accelerometers have an inherent Q-factor (or "Q"). A system's Q-factor is a measure of its resonance characteristics. In other words, an accelerometer's suspended beam may be forced to resonate, by subjecting the accelerometer to a periodic acceleration via a test signal that changes the capacitance between the fingers of the beam and the substrate. Although a beam does not resonate when detecting a linear acceleration, the compliance of the suspension system, and therefore the tendency of the beam to be displaced when subjected to acceleration, is correlated to the Q of the beam. The Q-factor is a dimensionless parameter that describes how damped an oscillator is. In the art, it is generally accepted that low quality factor of Q<0.5 is overdamped and doesn't oscillate and a system with a high quality factor of Q>0.5 is underdamped where the oscillations combine at a specific frequency with a decay of the amplitude of the signal.

Figure 2:
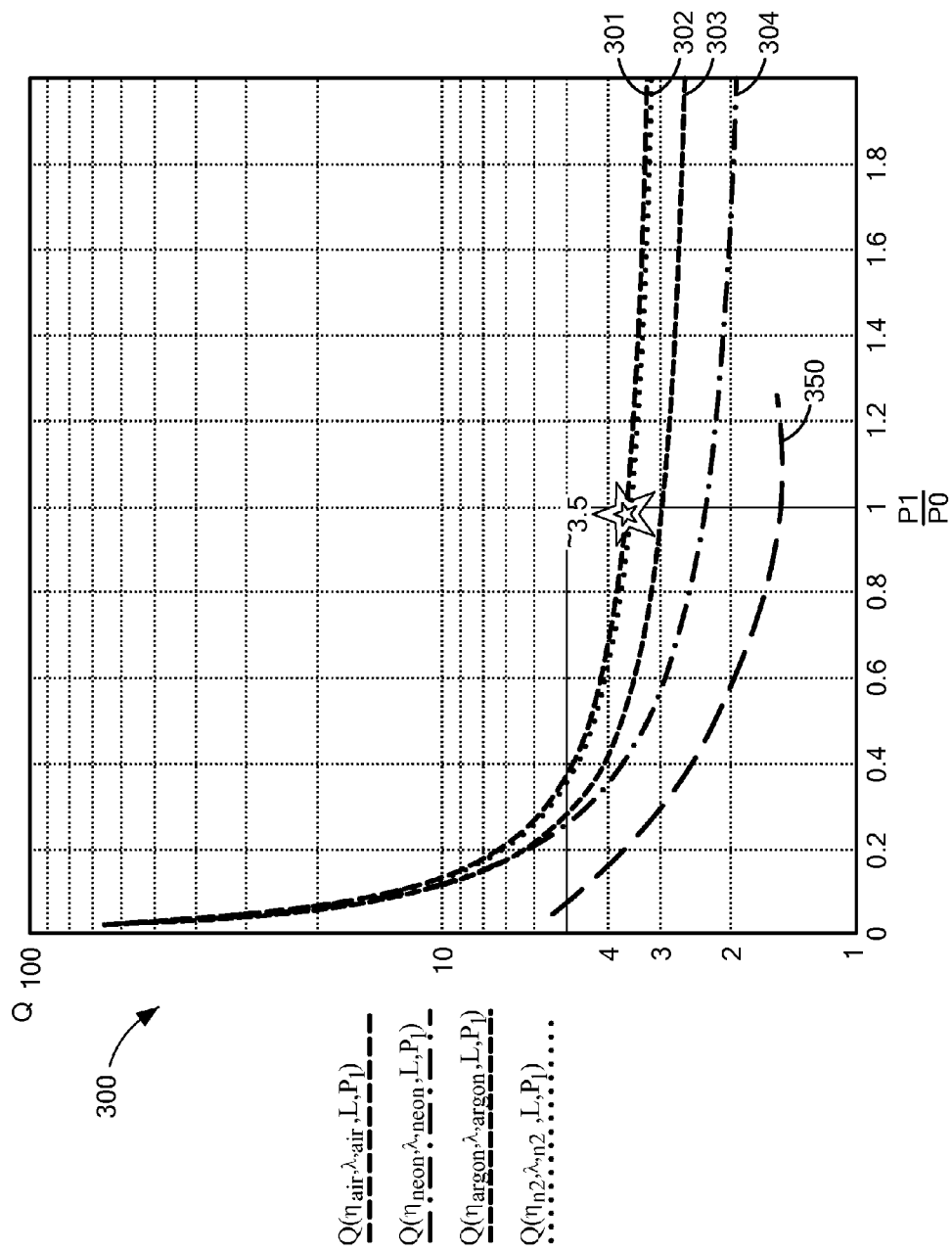
FIG. 2 shows Q-factor curves as compared to pressure ratios for various fluids.

FIG. 2 shows a graph comparing the Q of various damped accelerometers. Specifically, the graph compares the Q of an accelerometer, for example, filled with various dampening gasses at a variety of pressures. In each case, each such the gas may be known as a "fill gas"). In graph 300, gas pressure is represented as a ratio of the pressure (P1) of the fill gas to atmospheric pressure (P0), and the Q axis is logarithmic. As illustrated, the pressure of the gas may range from below 0.1 atmospheres to 1.2 atmospheres or more, and in some embodiments may be 0.2 atmospheres, 0.25 atmospheres, 0.3 atmospheres, 0.4 atmospheres, 0.5 atmospheres, 0.6 atmospheres, 0.7 atmospheres, 0.8 atmospheres, 0.9 atmospheres, or 1 atmosphere, or any pressure within the range.

As shown, the Q of the accelerometers tends to decrease with increasing pressure of the fill gas 301-304. Conversely, at low pressures, an accelerometer's Q tends to increase. If the hermetic seal between the substrate 102 and cap 110 leaks, the pressure within the volume 160 will increase, and, as shown by curve 350 in FIG. 2, the Q of the accelerometer will decrease accordingly. As such, the integrity of the hermetic seal of an accelerometer may be tested by assessing the Q of the accelerometer. For example, if an accelerometer 100 is designed and fabricated to have a Q of approximately 2.0 with a fill gas pressure of 0.2 atmospheres, then a Q of less than 2.0 would indicate that the pressure within volume 106 has increased (e.g., to approximately one atmosphere), meaning that the hermetic seal has failed. In embodiments of the invention, rather than determining the Q value for a given accelerometer for determining if hermeticity has been maintained, an applied test signal can be used to measure the amplitude response (Frequency response) of the MEMS accelerometer at any frequency that is affected by the damping characteristic of the hermetic environment.

Figure 3A:
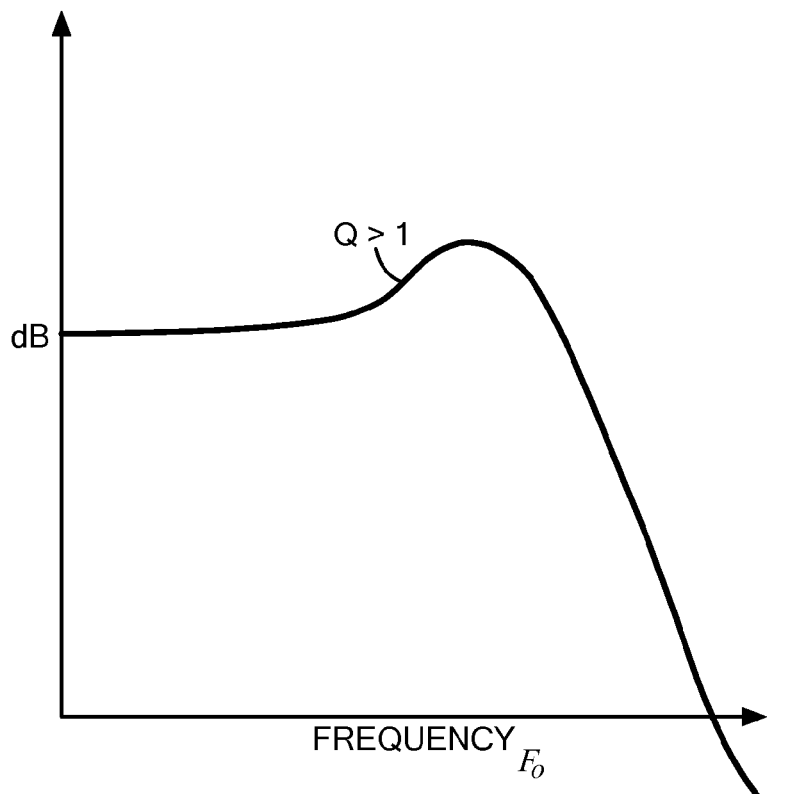
FIGS. 3A-3F show frequency response curves for accelerometers having different properties.
Figure 3B:
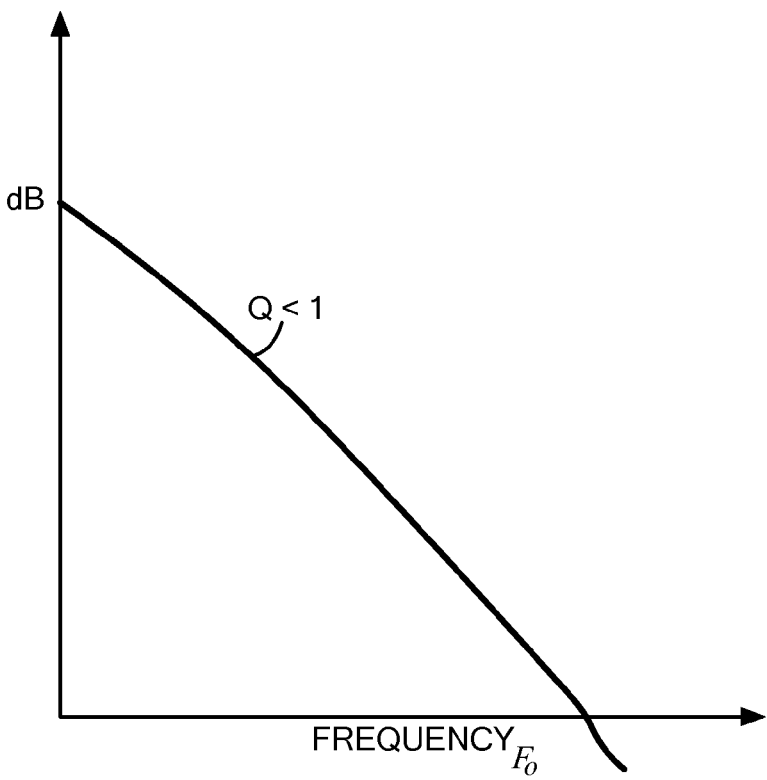
Figure 3C:
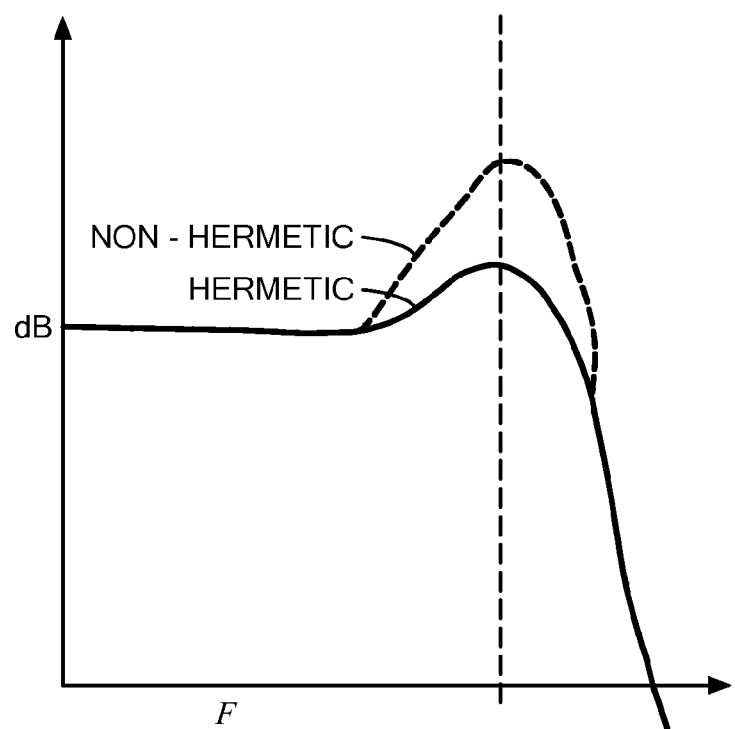
Figure 3D:
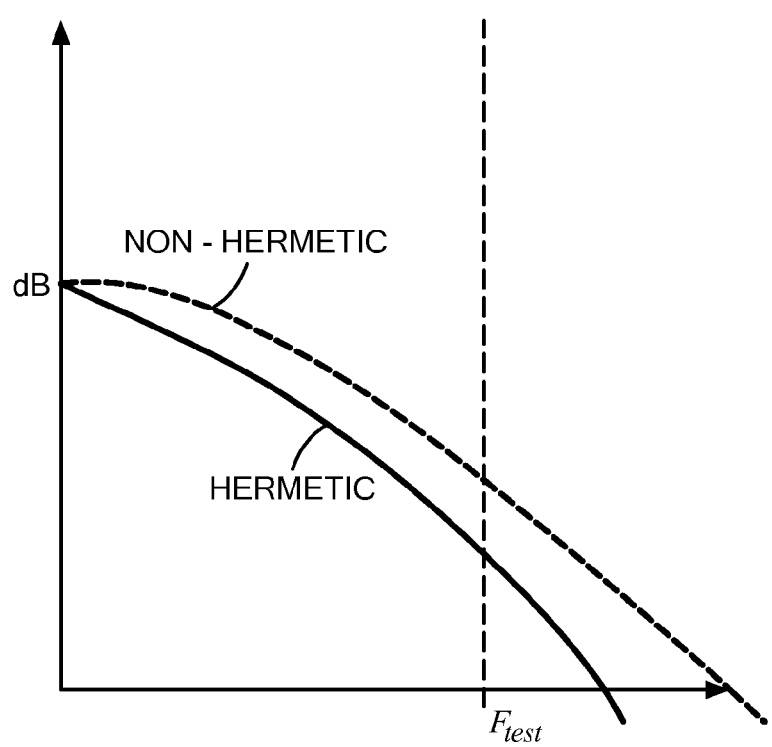
Figure 3E:
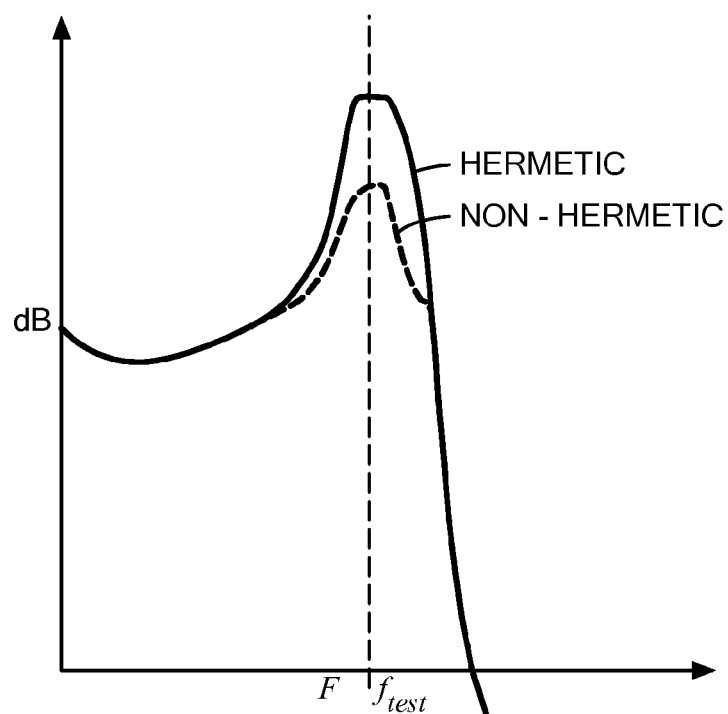
Figure 3F:
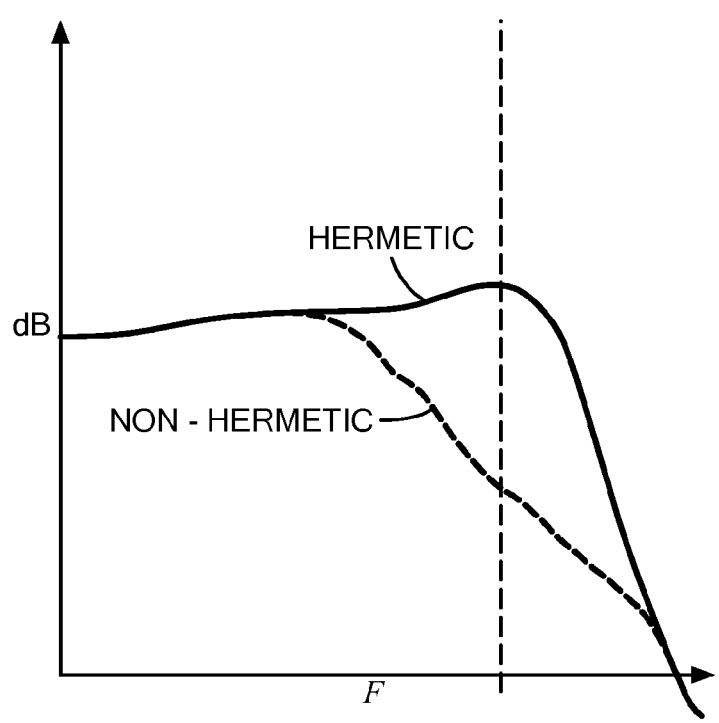

FIGS. 3A and 3B show frequency response curves for hermetically sealed accelerometers wherein the Q value differs between a Q of greater than 1 for FIG. 3A and less than 0.5 for FIG. 3B. The frequency response curves are presented on a logarithmic scale vs. frequency wherein the output signal amplitude is measured. Hermeticity can be determined without the need to measure the pressure within the cavity. The output frequency response will change with respect to a loss in the hermeticity. FIGS. 3C and 3D show the change to the frequency response curve due to the loss in hermeticity wherein the gas that is within the cap is a relatively heavy gas (high viscosity) or the pressure within the cap is greater than that of the ambient environment (external to the accelerometer). It should be recognized that Neon and Argon are commonly used "heavy" gasses whereas air would be considered to be a "light" gas by comparison. The behavior of the MEMS sensor in either embodiment (light or heavy gas environment) can be modeled and therefore amplitude changes for a test signal with a known frequency will result in an accurate determination of whether hermeticity remains or has been lost. For a given test frequency, when hermeticity is lost for both an overdamped and underdamped accelerometer, the amplitude of the frequency response will increase at the test frequency. FIGS. 3E and 3F show the change in the frequency response curve due to the loss in hermeticity wherein the fill gas is a relatively light gas (low viscosity) or the pressure of the fill gas is less than that of the ambient environment (external to the accelerometer). When hermeticity is lost, at a given test frequency, the amplitude of the frequency response will decrease for both the overdamped an underdamped accelerometers.

Figure 4:
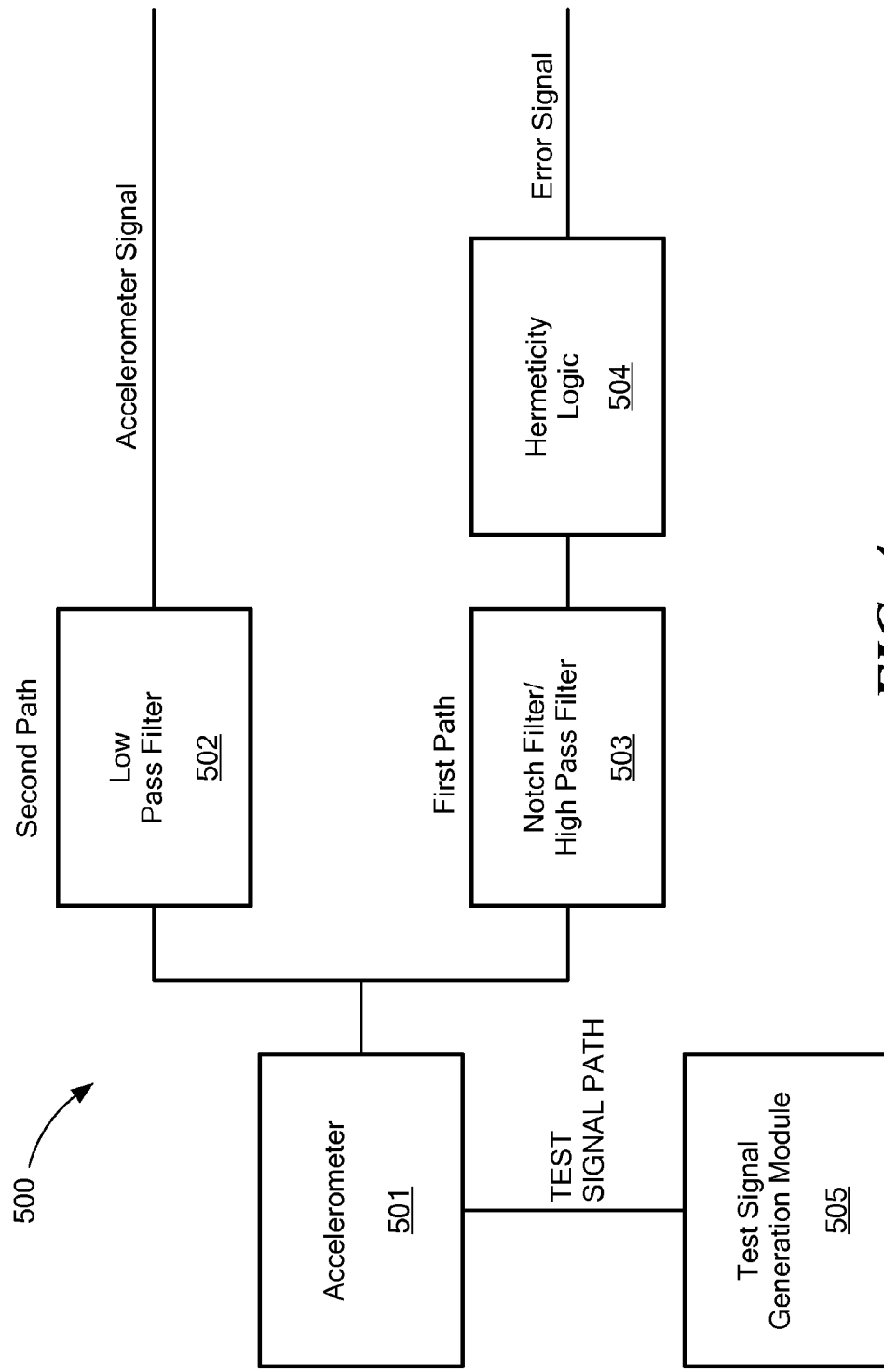
FIG. 4 shows a schematic of circuitry for determining if hermeticity of a capped MEMS device is lost during operation.

FIG. 4 shows an accelerometer system 500 that can be used to determine if the hermeticity of the cap has failed. In such a system, an accelerometer is provided with a test signal. The test signal may be an alternating current electrostatic force at either a variable frequency or a fixed frequency. In addition to hermeticity, this system and methodology can be used to detect faults that can occur with the sensor structure including breakage of a sensor element and any impediment that restricts the motion of the MEMS structure, such as stiction. This test signal may be applied during operation of the accelerometer.

The test signal is applied to the electrically conductive fingers wherein the frequency at which the test signal is applied is above the operational frequency range for the accelerometer. As such, the test signal will not interfere with the acceleration signal during usage and the test signal can be filtered out. In one embodiment, the acceleration output signal, which includes both the test signal and the acceleration signal resulting from an external force being applied to the accelerometer is provided to a plurality of paths.

The first path includes a notch filter 503 for filtering out the acceleration signal from the output signal leaving only the test signal within a frequency range of the notch filter 503. The resultant signal from the notch filter 503 is passed to a comparator or comparison logic 504 wherein the amplitude of the signal at a test frequency can be compared to an expected amplitude. If the amplitude differs from the expected amplitude, then the system comparison module 504 will issue an error signal that indicates that the hermeticity of the cap has failed. In some embodiments, a comparator may simply be used. In other embodiments, more complex logic may be used. The comparison logic may compare the amplitude of the filtered test signal to a threshold at a test frequency and confirm that the test signal is outside of a range of possible values, in order to account for operational variations of the accelerometer during real world operation. Thus, once the test signal is outside of the range, an error signal will be issued. Operational conditions may include the ambient pressure and temperature that may affect the accuracy of the accelerometer. Other known logic for comparing the test signal to an expected frequency response over one or more frequencies may be employed without deviating from the intended scope of the invention.

The second path includes a low pass filter 502 for filtering the output signal such that the test signal is filtered and all that is left is the accelerometer signal. The accelerometer signal is then output and can be passed to another logical unit or processor for using the accelerometer signal.

Figure 5:
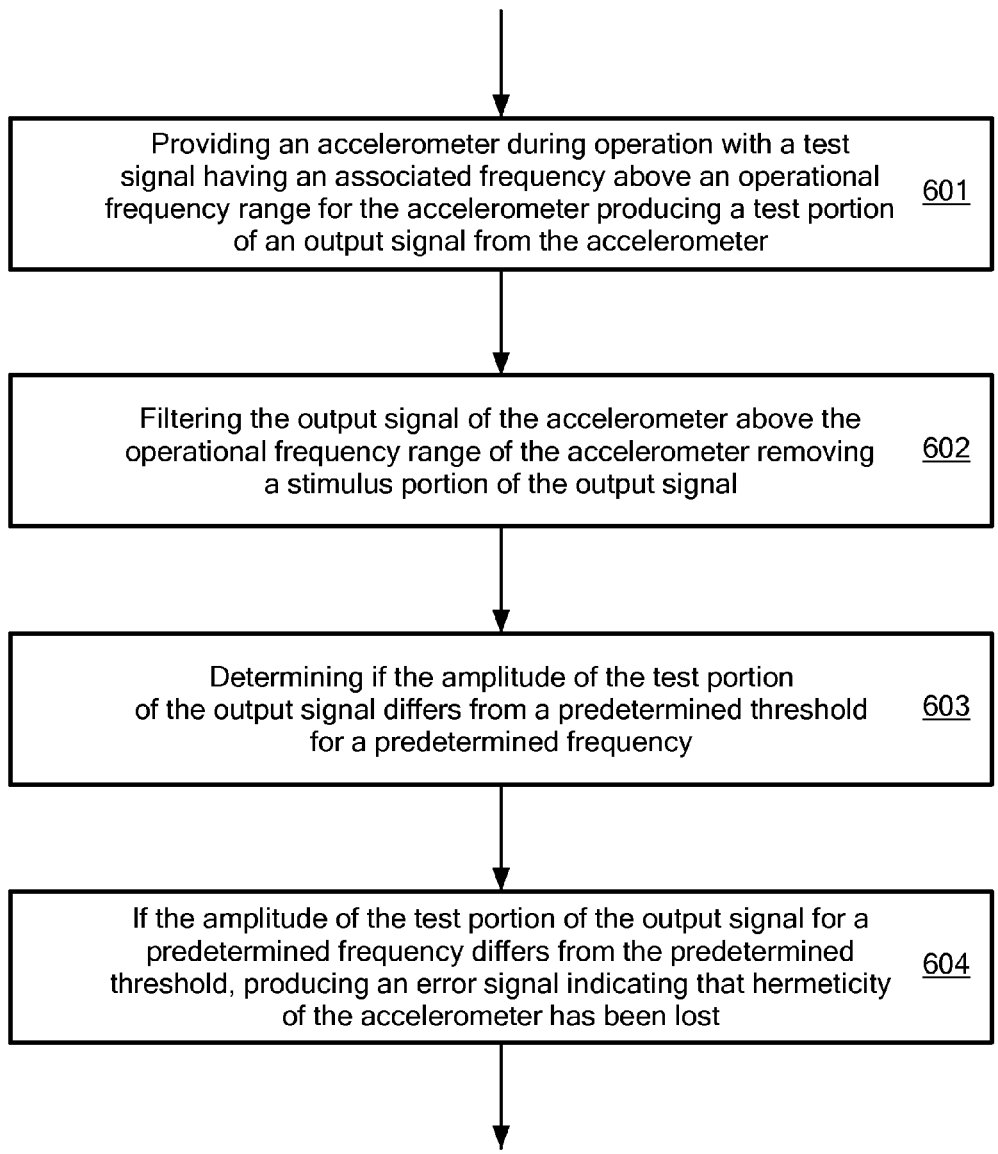
FIG. 5 shows a flow chart of one embodiment for a self-test for a hermetically capped MEMS device to determine hermeticity during operation.

FIG. 5 shows a flow chart of one embodiment of the invention. In 601, the accelerometer is provided with a test signal through a test path. For example, the accelerometer may have electrically conductive fingers that are designed specifically for receiving a test signal. Thus, a test signal, such as an AC signal that stimulates the fingers causes the beam to oscillate. The AC signal is selected such that the test signal is above the operational frequency range for the accelerometer. The accelerometer may be in operation during the test signal such that the accelerometer generates an output signal that results from both the test signal and also an external mechanical stimulus. In 602, the accelerometer output is provided to a filter that filters out the output as a result of the mechanical stimulus so that the output signal is only the result of the input test signal. The output signal may be sampled to determine an amplitude or the signal over a specified frequency range may be passed to a processor for determining signal amplitudes over the test frequency/frequencies. In 603, the amplitude of the test portion of the output signal is compared to a predetermined threshold. The predetermined threshold is indicative of the point at which hermeticity of the accelerometer can be guaranteed. Thus, a processor or comparator determines if the amplitude differs from a predetermined threshold for one or more predetermined test frequencies. Applicants are aware that many different sampling and comparison methods may be used to compare the output frequency response to a threshold frequency/frequency response without deviating from the scope of the invention. In 604, if the amplitude of the test portion of the output signal for the test frequency/frequencies differs from the predetermined threshold, an error signal is produced and output from the system if the hermeticity testing system is separate circuitry from the MEMS device or output from the accelerometer if the testing system is incorporated within the MEMS packaging. The error signal indicates that there has been a loss in hermeticity of the cap of the MEMS device.

Although the accelerometer schematically illustrated and discussed above are capacitance-type accelerometers, other accelerometers measure the displacement of the beam in other ways. For example, some accelerometers measure the displacement of a beam by use of piezo elements in the suspension system. However, for ease of illustration, examples of capacitive MEMS accelerometers are discussed herein, with the understanding that the principles disclosed are not limited to capacitance-based accelerometers, and could be applied to other accelerometer, including piezo-based accelerometers for example.

The embodiments of the invention described above are intended to be merely exemplary; numerous variations and modifications will be apparent to those skilled in the art. All such variations and modifications are intended to be within the scope of the present invention as defined in any appended claims.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the description above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for determining if a hermetically sealed micro-electrical mechanical system linear accelerometer measuring linear accelerations about one or more axes containing a hermetically sealed gas maintains its hermeticity during operation of the accelerometer under acceleration by an external stimulus, the method comprising:
   providing the linear accelerometer during operation with a test signal having an associated frequency above an operational frequency range for the linear accelerometer producing a test portion of an output signal from the linear accelerometer;
   filtering from the output signal the accelerometer frequencies at least below the operational frequency range of the linear accelerometer producing a test output signal, the test output signal not including frequencies within the operational frequency range of the linear accelerometer;
   determining if the amplitude of the test output signal differs from a predetermined threshold for a predetermined frequency wherein the predetermined threshold is based at least in part on the viscosity of the gas within the linear accelerometer; and
   if the amplitude of the test output signal differs from the predetermined threshold by a predefined range,
   producing an error signal indicating that hermeticity of the linear accelerometer has been lost otherwise hermeticity is maintained.

2. A method according to claim 1 wherein the test signal is an alternating current test signal.

3. A method according to claim 1 wherein the test signal is a periodic step function.

4. A method according to claim 1, further comprising:
   generating a stimulus portion of the output signal when the accelerometer is provided with the external stimulus.

5. A method according to claim 4 wherein the output signal of the accelerometer is composed of the stimulus portion and the test portion.

6. A method according to claim 5, further comprising:
filtering the output signal with a filter to remove the test portion of the output signal and providing the filtered output signal to an output wherein the filtered output signal represents the linear acceleration due to the external stimulus.

7. A method according to claim 1, wherein the filtering, determining, and producing an error signal are performed on circuitry external to an accelerometer package.

8. A method according to claim 1, wherein the filtering, determining, and producing an error signal are performed on circuitry internal to the accelerometer package.

9. A method according to claim 1 wherein filtering the output signal of the accelerometer above the operational frequency range is performed by a high-pass filter.

10. A method according to claim 1 wherein filtering the output signal of the accelerometer above the operational frequency range is performed by a notch filter.

11. The method according to claim 6, wherein filtering the output signal with a filter to remove the test portion of the output signal is performed by a low pass filter.

12. A system for determining if hermeticity of a hermetically capped linear accelerometer measuring linear acceleration about one or more axes containing a gas has been lost during operation under acceleration by an external stimulus, the system comprising:
an input for receiving an output signal of the linear accelerometer;
a first filter coupled to the input for filtering the output signal of the accelerometer to remove the test signal from the output signal so that only an acceleration signal representative of linear acceleration about one or more axes remains as the result of the external stimulus remains;
a second filter coupled to the input for filtering the output signal of the accelerometer to remove a stimulus portion of the output signal from the output signal so that only the test portion of the output signal remains wherein frequencies of the test portion are outside of the operational frequency range of the linear accelerometer;
a comparison module for comparing the test portion of the output signal to a threshold range wherein the predetermined threshold is based at least in part on the viscosity of the gas within the accelerometer and wherein if the amplitude of the test output signal differs from the predetermined threshold, hermeticity is found to be lost if the amplitude of the test output signal is greater than the predetermined threshold for gases with a viscosity greater than that of air and if the amplitude is not greater than the predetermined threshold for gases with a viscosity greater than that of air hermeticity is maintained and wherein hermeticity is found to be lost if the amplitude of the test output signal is less than the predetermined threshold for gases with a viscosity less than that of air and if the amplitude is not less than the predetermined threshold for gases with a viscosity less than that of air hermeticity is maintained; and an output for outputting an error signal if the hermeticity is found to be lost by the comparison module.

13. The system according to claim 12 further comprising:
a test generation signal module for generating a test signal for the linear accelerometer at a frequency above an operational range for the accelerometer.

14. The system according to claim 12 wherein the first filter is a low pass filter.

15. The system according to claim 12 wherein the second filter is a notch filter.

16. The system according to claim 12 wherein the second filter is a high pass filter.

17. The system according to claim 12 wherein the system includes a hermetically capped accelerometer.

18. The system according to claim 12 wherein the comparison module is a comparator.

19. The system according to claim 12 wherein the comparison module includes logic for identifying an amplitude for at least one frequency of the output signal corresponding to a known test signal and comparing the amplitude to the threshold.

20. A computer program product including a tangible computer-readable medium with computer code thereon for determining if a hermetically sealed linear accelerometer measuring linear acceleration about one or more axes has lost hermeticity during operation of the linear accelerometer under acceleration by an external stimulus, the computer code comprising:
computer code for providing the accelerometer during operation under acceleration by the external stimulus with a test signal having an associated frequency above an operational frequency range for the linear accelerometer producing a test portion of an output signal from the accelerometer;
computer code for filtering from the output signal the linear accelerometer frequencies at least below the operational frequency range of the linear accelerometer producing a test output signal wherein the test signal does not include frequencies within the operational frequency range of the linear accelerometer;
computer code for determining if the amplitude of the test output signal differs from a predetermined threshold by a predetermined range for a predetermined frequency wherein the predetermined threshold is based at least in part on the viscosity of the gas within the accelerometer; and
computer code for producing an error signal indicating that hermeticity of the accelerometer has been lost if the amplitude of the test output signal differs from the predetermined threshold by the predefined range otherwise hermeticity is maintained.

21. The method according to claim 1, wherein if the amplitude of the test output signal differs from the predetermined threshold hermeticity is found to be lost if the amplitude of the test output signal is greater than the predetermined threshold for gases with a viscosity greater than that of air and wherein hermeticity is found to be lost if the amplitude of the test output signal is less than the predetermined threshold for gases with a viscosity less than that of air.

22. The computer program product according to claim 20, wherein if the amplitude of the test output signal differs from the predetermined threshold hermeticity is found to be lost and the error signal is produced if the amplitude of the test output signal is greater than the predetermined threshold for gases with a viscosity greater than that of air and wherein hermeticity is found to be lost if the amplitude of the test output signal is less than the predetermined threshold for gases with a viscosity less than that of air.

* * * * *